March 12, 1946. W. GASSER 2,396,500
OIL COOLED PISTON
Filed July 11, 1944
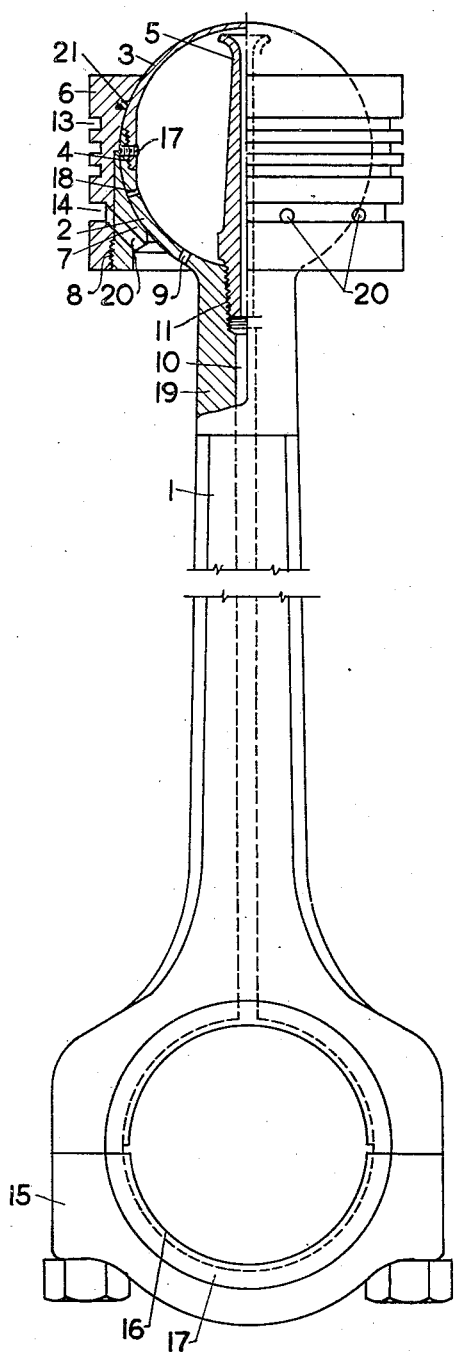
Fig. I
Fig. II
Inventor: Walter Gasser
By his Attorney:

Patented Mar. 12, 1946

2,396,500

UNITED STATES PATENT OFFICE 2,396,500

OIL COOLED PISTON

Walter Gasser, El Cerrito, Calif., assignor to Shell Development Company, San Francisco, Calif., a corporation of Delaware Application July 11, 1944, Serial No. 544,385

7 Claims. (Cl. 123—176)

The present invention relates to improved piston structures and more particularly to improved structure of oil cooled pistons for internal combustion engines.

In conventional piston assemblies, the piston is normally pivotally mounted on the connecting rod by means of a gudgeon pin. These pins, however, suffer from certain disadvantages due to the restricted space in which they must be accommodated. In the first place, the alignment of the gudgeon pin assembly in heavy duty engines must be extremely exact, particularly in the case of high compression internal combustion engines and Diesel engines wherein the pressures exerted on the gudgeon pin bearing surfaces are normally very great. Furthermore, large bearing surfaces cannot be provided as there is but limited space available for the gudgeon pin assembly and it is highly desirable to maintain the overall weight of the piston assembly as low as possible.

These factors jointly necessitate extreme care and precision in the manufacture and fitting of the ordinary type of piston pin assembly, and even when such care is taken the gudgeon pin, whether fixed at the middle or ends thereof, often deflect or distort under load with consequent extreme local pressure detrimental to good bearing contact and alignment.

In internal combustion engines it is also advantageous to provide means for cooling the piston head and piston assembly in order to reduce carbon formation on the piston and cylinder head surfaces, to minimize deterioration of the lubricating oils and to permit operation of the engine at high power output without danger of distortion and/or undue stresses of the piston assembly due to the high temperatures and pressures encountered under extreme operating conditions. Cooling of the cylinder walls is conventionally accomplished by means of cooling jackets through which a heat exchange liquid is passed or by air cooling of the external faces of the cylinder. However, in many instances, and particularly in the case of aircraft engines, it has been found necessary to provide additional means for cooling the combustion chamber, as for example by injecting water along with the fuel during takeoff or other maximum power output operation of the engines. Other systems which have been proposed include, for example, circulating oil through the gudgeon pins and then through passages provided in the piston head, and in another case, providing an oil conduit extending through the connecting rod to a spherical head on the connecting rod which engages a spherical recess in bearing members within the piston. These systems have been found in practice to be unsatisfactory, either due to inefficient cooling or to mechanical difficulties in construction.

It is an object of the present invention to provide an improved oil cooled piston assembly. A further object is to provide an improved piston assembly which is much lighter in weight than the conventional piston assemblies. A still further object is to provide a piston assembly in which the piston head may be maintained approximately at the temperature of the coolant passed through the piston assembly. Still another object is to provide an improved piston assembly which may be easily and readily utilized in any conventional piston engine. Other objects, together with some of the advantages to be derived in utilizing the piston assembly of the present invention, will become apparent from the following detailed description thereof, taken together with the accompanying drawing forming a part of the present specification, and wherein:

Figure I is an elevation, partly in section, of a piston assembly according to the present invention, and Figure II is a sectional elevation of the ring belt unit of the piston assembly shown in Figure I, the ring belt unit being rotated through 90° with respect to Figure I.

Referring to the drawing, a conventional connecting rod 1 is provided with a crank pin bearing housing 15 and bearing 17 which is in turn provided with an oil groove 16. Oil conduit 10 extends through the length of connecting rod 1 and is in flow communication with oil groove 16.

The piston comprises a ball and socket arrangement consisting firstly of a ball unit formed of two hemispherical shells 2 and 3 which are threadedly engaged at 4. Lock screw 23 passes through shells 2 and 3 and secures them in threaded engagement. The lower portion of shell 2 is rigidly attached to or formed as a part of rod member 19 which in turn is either rigidly attached to or formed as a part of connecting rod 1. A distributing nozzle 5 is threadedly mounted on rod element 19 in flow communication with oil conduit 10 and terminates at its upper end near the top of hemispherical shell 3.

A ring belt unit serves as a socket for the piston ball and is formed of three elements, ring belt 6 and retaining elements 7 and 7a which form a split ring retaining unit. Ring belt 6 is provided with annular grooves as at 13 for compression rings and at 14 for an oil ring in the conventional manner. The inner faces of ring belt 6 and retaining elements 7 and 7a are shaped to fit the curvature of the piston ball. On the inner face of ring belt 6, near the upper end thereof, an annular groove 12 is provided in which an oil scraper ring 21 is disposed.

The piston is assembled by placing ring belt 6 over the top of the piston ball, placing retaining elements 7 and 7a together around connecting rod 1 beneath ring belt 6 and threading retaining elements 7 and 7a into the base of ring belt 6 at 8 until stopped by the internal annular shoulder provided at 22 on the inner face of ring belt 6. The parts are machined to provide a close fitting ball and socket joint when assembled as shown in Figure I.

In utilizing the piston assembly, oil is passed from the pressure lubrication system of the engine through oil groove 16 in bearing 17, through conduit 10 and distributing nozzle 5 to the top interior surface of hemisphere shell 3, from whence, after draining down in the interior walls of the piston ball, it passes back to the engine crankcase through a plurality of ports as at 9 provided near the bottom of hemisphere shell 2. The bearing surfaces between the piston ball and the ring belt assembly are lubricated by a plurality of small ports provided in the piston ball as at 18 in the area contacted by the ring belt unit. Escape of lubricant into the firing chamber is prevented by oil ring 21 in ring belt 6. Oil which is scraped from the cylinder wall by the oil ring in groove 14 of ring belt 6 passes by to the engine crankcase through a plurality of conduits as at 20 extending from the bottom of oil ring groove 14 through ring belt 6 and retaining elements 7 and 7a.

The piston structure shown has numerous inherent advantages which have been proven in practice. For example, due to the spherical design of the piston head, i. e. the top of the piston ball, compression loads only are exerted thereon and as a result the piston head may be formed much thinner than is possible with flat headed pistons which must also withstand tension stresses under operating conditions. This provides an initial advantage in lesser weight of the piston. However, of even more importance is the fact that better heat transfer is obtained as a result of the thin walled piston head and consequently improved cooling of the piston parts by the oil passed therethrough results. These facts are clearly evidenced from the following data obtained in the operation of a test engine with a piston constructed according to the principles set forth above. The piston assembly prepared according to the present invention weighed 5 pounds and 3 ounces, whereas the conventional piston assembly for the same engine weighed 7 pounds and 1 ounce. The piston ball prepared according to the present invention tapered to a minimum thickness of 1/16 of an inch at the top center of the ball.

The piston of the present invention was operated in the test engine with a rated compression ratio of 5.5:1 for a period of 20 hours under varying load conditions and a piston head temperature of the order of 200° F. maintained by passing oil through the piston. At the end of this period the piston was removed from the engine and examined for carbon deposition on the piston head. Only very small quantities of carbon were observed and these deposits were of a sooty nature which could be removed by wiping with a cloth. A conventional piston operating in the same engine under the same load conditions operates at a piston head temperature of the order of 500° F. and the carbon deposits are of a hard and flinty nature.

The marked temperature differential obtained in operating the engine with the two types of pistons is ascribed to the fact that in conventional piston assemblies the head load on the piston is normally removed by conduction of heat through the piston, ring belt, piston rings, oil film and thence to the cooling jacket or surrounding air. Due to the relatively slow rate of heat transfer and consequent high temperatures, various undesirable phenomena occur, particularly ring sticking, lacquer deposition and hard carbon formation. Further, fairly great clearances between moving elements is necessitated in order to take care of the thermal expansion of the various parts. In pistons constructed according to the principles of the present invention, the greater portion of the heat load is transmitted to the oil circulated to the piston ball, the ring belt area thereby being maintained at considerably lower temperatures and as a result completely free of lacquer and ring sticking deposits. Furthermore, the absence of any deposits on the interior surfaces of the piston ball indicated that the cooling oil had not been heated to deleteriously high temperatures.

A further advantage lies in the fact that the ring belt in the present piston assembly is free to rotate with respect to the piston, this movement assisting in preventing ring sticking and serving to equalize wear on piston rings, cylinder walls, ring belt and on the contact surfaces between the ring belt and the piston ball.

I claim as my invention:

1. In a piston assembly, the combination comprising a connecting rod including a coolant conduit extending longitudinally therethrough, a hollow piston ball rigidly mounted on said connecting rod, a distribution nozzle vertically mounted on said connecting rod within said piston ball in flow communication with said coolant conduit and adapted to direct coolant against the top inner surface of said piston ball and a ring belt unit engaging said piston ball to form a ball and socket joint, said piston ball extending above the top of said ring belt unit and forming the piston head.

2. In a piston assembly, the combination comprising a connecting rod including a coolant conduit extending longitudinally therethrough, a hollow piston ball rigidly mounted on said connecting rod, coolant distribution means mounted on the end of said connecting rod within said piston ball in flow communication with said coolant conduit, a ring belt unit engaging said piston ball to form a ball and socket joint, said piston ball extending above the top of said ring belt unit and forming the piston head and a plurality of ports in the wall of said piston ball in the area contacted by said ring belt unit.

3. In a piston assembly, the combination comprising a connecting rod including a coolant conduit extending longitudinally therethrough, a hollow piston ball rigidly mounted on said connecting rod, coolant distribution means mounted on the end of said connecting rod within said piston ball and in flow communication with said coolant conduit, a ring belt unit engaging said piston ball to form a ball and socket joint, said piston ball extending above the top of said ring belt unit and forming the piston head, and a plurality of ports in the lower section of said piston ball beneath the area of said piston ball contacted by said ring belt unit.

4. In a piston assembly, the combination comprising a connecting rod including a coolant conduit extending longitudinally therethrough, a hollow piston ball rigidly mounted on said connecting rod, coolant distribution means mounted on the end of said connecting rod within said piston ball and in flow communication with said coolant conduit, a ring belt unit engaging said piston ball to form a ball and socket joint, said piston ball extending above the top of said ring belt unit and forming the piston head, a plurality of ports in the lower section of the wall of said piston ball beneath the area of said piston ball contacted by said ring belt unit, a plurality of ports in the wall of said piston ball in the area contacted by said ring belt unit and a coolant retaining ring contacting said piston ball and supported in a groove in the upper section of said ring belt unit lying in a plane perpendicular to the longitudinal axis of said ring belt unit.

5. In a piston assembly, the combination comprising a connecting rod including a coolant conduit extending longitudinally therethrough, a hollow piston ball rigidly mounted on said connecting rod, coolant distribution means mounted on the end of said connecting rod within said piston ball and in flow communication with said coolant conduit, a ring belt element supported on said piston ball, a retaining ring unit threadedly engaging said ring belt element, said ring belt element and said retaining ring unit forming a ball and socket joint with said piston ball, said piston ball extending above said ring belt element and forming the piston head, a plurality of ports in the wall of said piston ball in the area contacted by said ring belt element and said retaining ring unit and a coolant retaining ring contacting said piston ball and supported in a groove in the upper section of said ring belt element lying in a plane perpendicular to the longitudinal axis of said ring belt element.

6. In a piston assembly, the combination comprising a connecting rod including a coolant conduit extending longitudinally therethrough, a hollow piston ball rigidly mounted on said connecting rod, a distribution nozzle vertically mounted on the end of said connecting rod within said piston ball in flow communication with said coolant conduit and adapted to direct coolant against the top of said piston ball, a ring belt element supported on said piston ball, a retaining ring unit threadedly engaging said ring belt element, said ring belt element and said retaining ring unit forming a ball and socket joint with said piston ball, said piston ball extending above said ring belt element and forming the piston head, a plurality of ports in the wall of said piston ball in the area contacted by said ring belt element and said retaining ring unit, a coolant retaining ring contacting said piston ball and supported in a groove in the upper section of said ring belt element lying in a plane perpendicular to the longitudinal axis of said ring belt element and a plurality of ports in the lower section of said piston ball beneath the area of said piston ball contacted by said retaining ring unit.

7. In a piston assembly, the combination comprising a connecting rod, a hollow piston ball rigidly mounted on said connecting rod, coolant distributing means mounted on the end of said connecting rod for introducing coolant within the upper portion of said hollow piston ball, a plurality of ports in the lower portion of said piston ball for discharging said introduced coolant and a ring belt unit girdling said piston ball to form a ball and socket joint, the top of said piston ball forming the piston head.

WALTER GASSER.